(12) United States Patent
Abe

(10) Patent No.: US 9,116,330 B2
(45) Date of Patent: Aug. 25, 2015

(54) IMAGE PICKUP LENS AND IMAGE PICKUP APPARATUS INCLUDING THE SAME

(71) Applicant: CANON KABUSHIKI KAISHA, Tokyo (JP)

(72) Inventor: Hirofumi Abe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 14/217,556

(22) Filed: Mar. 18, 2014

(65) Prior Publication Data

US 2014/0293444 A1    Oct. 2, 2014

(30) Foreign Application Priority Data

Mar. 29, 2013   (JP) ................................. 2013-072747

(51) Int. Cl.
*G02B 13/00* (2006.01)
*G02B 13/04* (2006.01)
*G02B 13/18* (2006.01)

(52) U.S. Cl.
CPC ............ *G02B 13/04* (2013.01); *G02B 13/0045* (2013.01); *G02B 13/18* (2013.01)

(58) Field of Classification Search
CPC .............................. G02B 13/04; G02B 13/0045
USPC .................................................. 359/749, 753
See application file for complete search history.

(56) References Cited

U.S. PATENT DOCUMENTS

| 5,999,337 | A  | * | 12/1999 | Ozaki ............................ 359/793 |
| 7,623,305 | B2 | * | 11/2009 | Adachi .......................... 359/749 |
| 8,248,715 | B2 | * | 8/2012  | Asami et al. .................. 359/762 |
| 8,659,841 | B2 | * | 2/2014  | Enomoto ....................... 359/753 |
| 9,013,812 | B2 | * | 4/2015  | Kubota et al. ................. 359/753 |

FOREIGN PATENT DOCUMENTS

| JP | 2004-145256 A | 5/2004 |
| JP | 2005-221920 A | 8/2005 |

* cited by examiner

*Primary Examiner* — David N Spector
(74) *Attorney, Agent, or Firm* — Carter, DeLuca, Farrell & Schmidt, LLP

(57) ABSTRACT

An image pickup lens includes, in order from an object side; a negative front lens unit; a stop; and a positive rear lens unit, wherein the front lens unit includes a negative front first lens, a negative front second lens, and a positive front third lens, in order from the object side, wherein the rear lens unit includes a positive rear first lens having at least one aspherical surface and a cemented lens made up of a positive rear second lens and a negative rear third lens, in order from the object side, and wherein an Abbe constant of a positive lens disposed on the most object side, an Abbe constant of a negative lens disposed on the most image side, a focal length of the front lens unit, and a focal length of the rear lens unit are appropriately set.

7 Claims, 3 Drawing Sheets

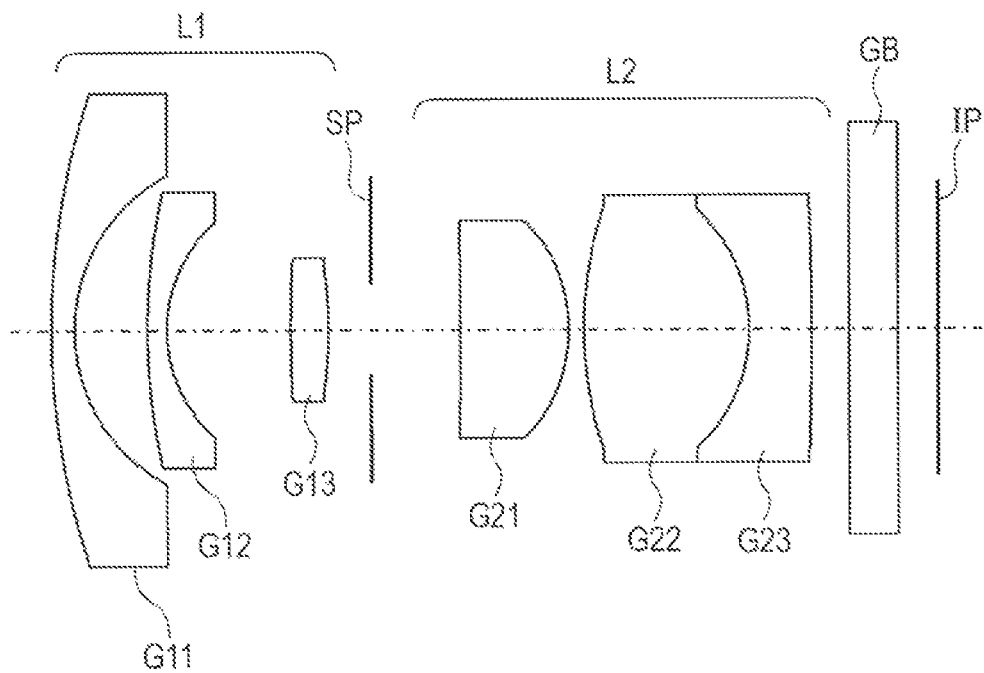
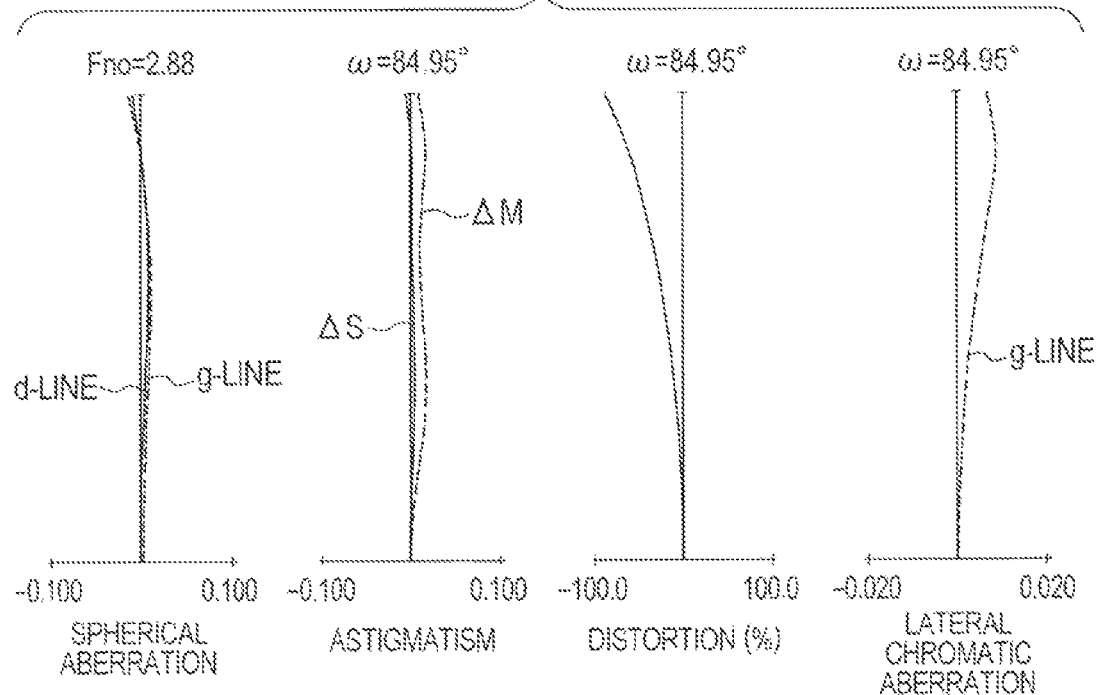

IMAGE PICKUP LENS AND IMAGE PICKUP APPARATUS INCLUDING THE SAME

BACKGROUND OF THE INVENTION

1. Field of the Invention

The present invention relates to an image pickup lens for forcing a subject image on an image pickup element such as a CCD sensor or a CMOS sensor, and relates to an image pickup lens suitable for a video camera, a monitoring camera, a digital still camera, and the like and an image pickup apparatus including the same.

2. Description of the Related Art

Of image pickup optical systems used in image pickup apparatuses such as digital video cameras in recent years, a video camera with a wide angle of field over 160° is increasingly popular. Such a video easier a with a wide angle of field is regained to be compact and have high optical performance.

Many wide angle lenses have conventionally been proposed for use in the above-mentioned video camera, monitoring camera, and the like. For example, Japanese Patent Application Laid-Open No. 2005-221920 and Japanese Patent Application Laid-Open No. 2004-145256 each propose a wide angle lens including 6 lenses in 5 lens units.

The image pickup lenses described in Japanese Patent Application Laid-open No. 2005-221920 and Japanese Patent Application Laid-open No. 2004-145256 achieve an angle of field of 160° or more, but have a problem that the total lone length is long as the distance from a lens surface on the most object side to an image plane is about 10 times the focal length. These wide angle lenses have the angle widened by inducing large negative distortion. That is, an optical image is formed by compressing a subject on the image plane. However, since lateral chromatic aberration is reflected on the image plane without being compressed, there is also a problem that the influence of lateral chromatic aberration is more noticeable when a larger amount of distortion is induced for angle widening.

SUMMARY OF THE INVENTION

The present invention has been made to solve the problems stated above, and has an object of providing an image pickup lens that has a wide image pickup angle of field of 160° or more, is compact, and successfully corrects lateral chromatic aberration, and an image pickup apparatus including the same.

An image pickup lens according to the present invention includes, in order from an object side to an image side; a front lens unit having negative refractive power; a stop; and a rear lens unit having positive refractive power, wherein the front lens unit includes a front first lens having negative refractive power, a front second lens having negative refractive power, and a front, third lens having positive refractive power, in order from the object side, wherein the rear lens unit includes a rear first lens having at least one aspherical surface and having positive refractive power and a cemented lens that is made up of a rear second lens having a positive refractive power and a rear third lens having a negative refractive power, in order from the object side to the image side, and wherein the following are satisfied $$2.3 < \nu p/\nu n < 4.0$$

$$-3.0 < f1/f2 < -1.0$$

where νp is an Abbe constant of a positive lens disposed on the most object side in the image pickup lens, νn is an Abbe constant of a negative lens disposed on the most image side in the image pickup lens, f1 is a focal length of the front lens unit, and f2 is a focal length of the rear lens unit.

According to the present invention, it is possible to obtain an image pickup lens that has a wide image pickup angle of field of 160° or more, is compact, and successfully corrects lateral chromatic aberration, and an image pickup apparatus including the same.

Further features of the present invention will become apparent from the for lowing description of exemplary embodiments with reference to the attached drawings.

BRIEF DESCRIPTION OF THE DRAWINGS

FIG. 3 is a sectional diagram of an image pickup lens in Embodiment 2.

FIG. 4 is an aberration diagram of the image pickup lens in Embodiment 2.

DESCRIPTION OF THE EMBODIMENTS

Figure 1:
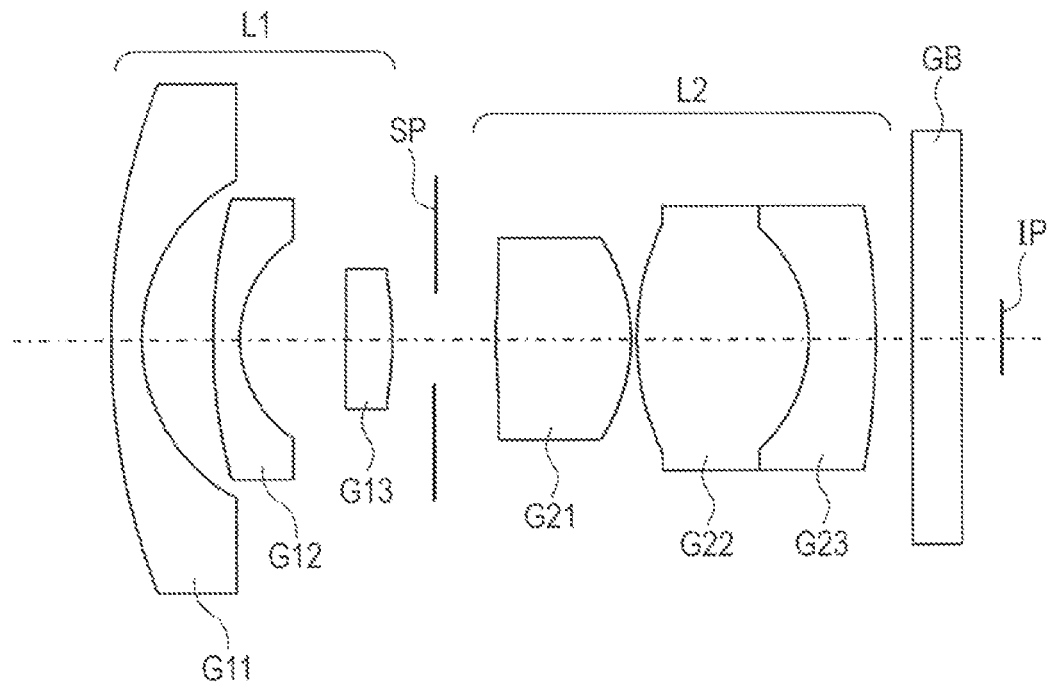
FIG. 1 is a sectional diagram of an image pickup lens in Embodiment 1.

Preferred embodiments of the present invention will now be described, in detail in accordance with the accompanying drawings.

The following describes an image pickup lens according to the present invention, with reference to the drawings.

The image pickup lens according to the present invention includes a front lens suit L1 having negative refractive power, an aperture stop SP, and a rear lens unit L2 having positive refractive power, in order from the object side to the image side. The front lens unit L1 includes a front first lens G11 having negative refractive power, a front second lens G12 having negative refractive power, and a front third lens G13 having positive refractive power, in order from the object side to the image side. The rear lens unit L2 includes a rear first; lens G21 having positive refractive power and a cemented lens made up of a rear second lens G22 having positive refractive power and a rear third lens G23 having negative refractive power, in order from the object side to the image side. The rear first lens G21 has at least one aspherical surface.

The image pickup lens according to the present invention satisfies the following numerical condition.

$$2.3 < \nu p/\nu n < 4.0 \tag{1}$$

Here, νp is the Abbe constant of the positive lens disposed on the most object side in the whole system (image pickup lens), and νn is the Abbe constant of the negative lens disposed on the most image side in the whole system (image pickup lens).

Let nd be a refractive index, for d-line (587.6 nm), nF be a refractive index for F-line (486.1 nm), and nC be a refractive index for C-line (656.3 nm). Then, the Abbe constant νd is defined as follows.

$$\nu d = (nd-1)/(nF-nC)$$

The conditional expression (1) is a conditional expression relating to chromatic aberration of the image pickup lens. By setting the Abbe constants νp and νn so as to be within the numerical range of the conditional expression (1), the dispersion amount of chromatic aberration in toe front lens unit is reduced. Moreover, by correcting chromatic aberration by the cemented lens in the rear lens unit, the amount of chromatic aberration in the whole system is effectively reduced. Exceeding the upper limit of the conditional expression (1) is not desirable because lateral chromatic aberration in the whole system is insufficiently corrected. Exceeding the lower limit of the conditional expression (1) is not desirable because the dispersion amount of chromatic aberration in the front lens unit increases and larger residual aberration is left after correcting lateral chromatic aberration.

The image pickup lens according to the present invention also satisfies the following numerical condition.

$$-3.0 < f1/f2 < -1.0 \tag{2}$$

Here, f1 is the focal length of the front lens unit, and f2 is the focal length of the rear lens unit.

The conditional expression (2) is a conditional expression relating to power layout in the optical system. The lens according to the present invention includes two units, as mentioned above. This is a negative-lead lens advantageous for a wide angle and compactness, with a small number of lens units. Exceeding the upper limit of the conditional expression (2) is not desirable in terms of lens compactness because the power of the rear lens unit is too weak and so the total length of the optical system increases. Exceeding the lower limit of the conditional expression (2) is not desirable because the power of the rear lens unit is too strong and so coma and spherical aberration are hard to be corrected.

The upper and lower limits of the conditional expressions (1) and (2) may be limited as follows.

$$2.3 < vp/vn < 3.5 \tag{1a}$$

$$-2.5 < f1/f2 < -1.1 \tag{2a}$$

The upper and lower limits of the conditional expressions (1) and (2) may be further limited as follows, $$2.4 < vp/vn < 3.0 \tag{1b}$$

$$-2.1 < f1/f2 < -1.2 \tag{2b}$$

The image pickup lens and the image pickup apparatus including the same, which are the object of the present invention, are realised by satisfying the structure described above.

Moreover, to have a wide angle of field, be compact, and successfully correct lateral chromatic aberration, the image pickup lens and the image pickup apparatus including the same according to the present invention may satisfy at least one of the following features.

$$3.0 < vcp/vcn < 5.0 \tag{3}$$

Here, vcp is the Abbe constant of the positive lens of the cemented lens in the rear lens unit, and vcn is the Abbe constant of the negative lens of the cemented lens in the rear lens unit.

The conditional expression (3) defines a condition for effectively correcting chromatic aberration, by defining the ratio in Abbe constant between the positive lens and the negative lens of the cemented lens in the rear lens unit. Exceeding the upper limit of the conditional expression (3) is not desirable because axial chromatic aberration is excessively corrected. Exceeding the lower limit of the conditional expression (3) is not desirable because axial chromatic aberration is insufficiently corrected. The upper and lower limits of the conditional expression (3) may be limited as follows.

$$3.2 < vcp/vcn < 4.5 \tag{3a}$$

The upper and lower limits of the conditional expression (3) may be further limited as follows.

$$3.5 < vcp/vcn < 4.1 \tag{3b}$$

The image pickup lens and the image pickup apparatus including the same according to the present invention also satisfy the following conditional expression (4).

$$0.8 < vln/vlp < 1.5 \tag{4}$$

Here, vln is the Abbe constant of the front second lens G12 in the front lens unit, and vlp is the Abbe constant of the front third lens G13 in the front lens unit.

The conditional expression (4) defines a condition relating to chromatic aberration that occurs in the front lens unit of the image pickup lens. Exceeding the upper limit of the conditional expression (4) is not desirable because the dispersion amount of chromatic aberration in the front lens unit increases and larger residual aberration is left after correcting lateral chromatic aberration. Exceeding the lower limit of the conditional expression (4) is not desirable because the amount or chromatic aberration in the front lens unit is too large and so lateral chromatic aberration is hard to be corrected in the whole system. The upper and lower limits of the conditional expression (4) may be limited as follows.

$$0.9 < vln/vlp < 1.4 \tag{4a}$$

The upper and lower limits of the conditional expression (4) may be further limited as follows.

$$1.0 < vln/vlp < 1.2 \tag{4b}$$

The image pickup lens and the image pickup apparatus including the same according to the present invention also satisfy the following conditional expression (5).

$$-6.0 < f1/f < -2.0 \tag{5}$$

Here, f is the focal length of the whole system of the image pickup lens.

The conditional expression (5) is a conditional expression relating to power layout of the front lens unit Exceeding the upper limit of the conditional expression (5) is not desirable because the power of the front lens unit is too strong and various aberrations such as field curvature and come are hard to be corrected. Exceeding the lower limit of the conditional expression (5) is not desirable in terms of angle widening and compactness because the negative refractive power of the front lens unit necessary for a wide angle of field is insufficient and also the diameter of the front lens unit increases. The upper and lower limits of the conditional expression (5) may be limited as follows.

$$-5.5 < f1/f < -2.2 \tag{5a}$$

The upper and lower limits of the conditional expression (5) may be further limited as follows, $$-5.0 < f1/f < -2.5 \tag{5b}$$

In the image pickup lens according to the present invention, the front lens unit includes the meniscus front first lens G1 having a concave surface facing the image side, the meniscus front second lens G12 having a concave surface facing the image side, and the front third lens G13 having a convex surface facing the image side, in order from the object side. This lens structure successfully corrects field curvature and astigmatism while achieving a wide angle in the front lens unit. In the front lens unit, a light beam of a wide angle of field is bent to the image side by arranging negative power on the object side, and field curvature and astigmatism are corrected by arranging positive power on the image side.

In the image pickup lens according to the present invention, the rear lens unit includes the biconvex rear first lens G21 having both aspherical surfaces and the cemented lens made up of the biconvex rear second lens G22 having positive refractive power and the rear third lens G23 having a concave surface facing the object side and having negative refractive power, in order from the object side to the image side. This lens structure successfully corrects spherical aberration and coma while reducing chromatic aberration in the whole system. The rear first lens G21 corrects spherical aberration by the aspherical surface facing the object side, and corrects coma by the aspherical surface facing the image side. The cemented lens in the rear lens unit effectively corrects chromatic aberration by its cemented surface that is a convex surface facing the image side.

The following describes a lens structure in each embodiment. It is assumed here that the lens structure is in order from the object side to the image side, unless otherwise stated. An image pickup lens in each embodiment is an image pickup lens system used in an image pickup apparatus such as a video camera, a monitoring camera, or a digital camera. In each lens sectional diagram, the left is the object side and the right is the image side.

Embodiment 1

FIG. 1 is a sectional diagram of an image pickup lens in Embodiment 1 (Numerical Embodiment 1) of the present invention.

The image pickup lens in Embodiment 1 (Numerical Embodiment 1) of the present, invention includes a front lens unit L1 having negative refractive power, an aperture stop SP, and a rear lens unit L2 having positive refractive power, in order from the object side to the image side. An optical block GB corresponding, to an optical filter or the like and an image plane IP are arranged on the image side of the image pickup lens according to the present invention illustrated in FIG. 1. The image plane IP corresponds to: an image pickup surface of a solid-state image pickup element (photoelectric transducer) in the case where the image pickup lens is used as an image pickup optical system in a video camera or a digital camera; and a film surface in the case where the image pickup lens is used as an image pickup optical system in a silver-halide film camera.

The front lens unit L1 includes three lenses that are a front first lens G11, a front second lens G12, and a front third lens G13, in order from the object side to the image side. The rear lens unit L2 includes a rear first lens G21, a rear second lens G22, and a rear third lens G23, in order from the object side to the usage side. The front first lens G11 and the front, second lens G12 are each a meniscus negative lens having a concave surface facing the image side, and the front third, lens G13 is a positive lens having a convex surface facing the image side. Relatively low dispersion glass is used in the positive front third lens G13, to reduce the amount of secondary spectrum of chromatic aberration in the whole system. The biconvex rear first lens G21 is a positive lens having both aspherical surfaces. The biconvex rear second lens G22 is a positive lens. The rear third lens G23 is a negative lens having a concave surface facing the object side. The rear second lens G22 and the rear third lens G23 are cemented together, to form a cemented lens.

Figure 2:
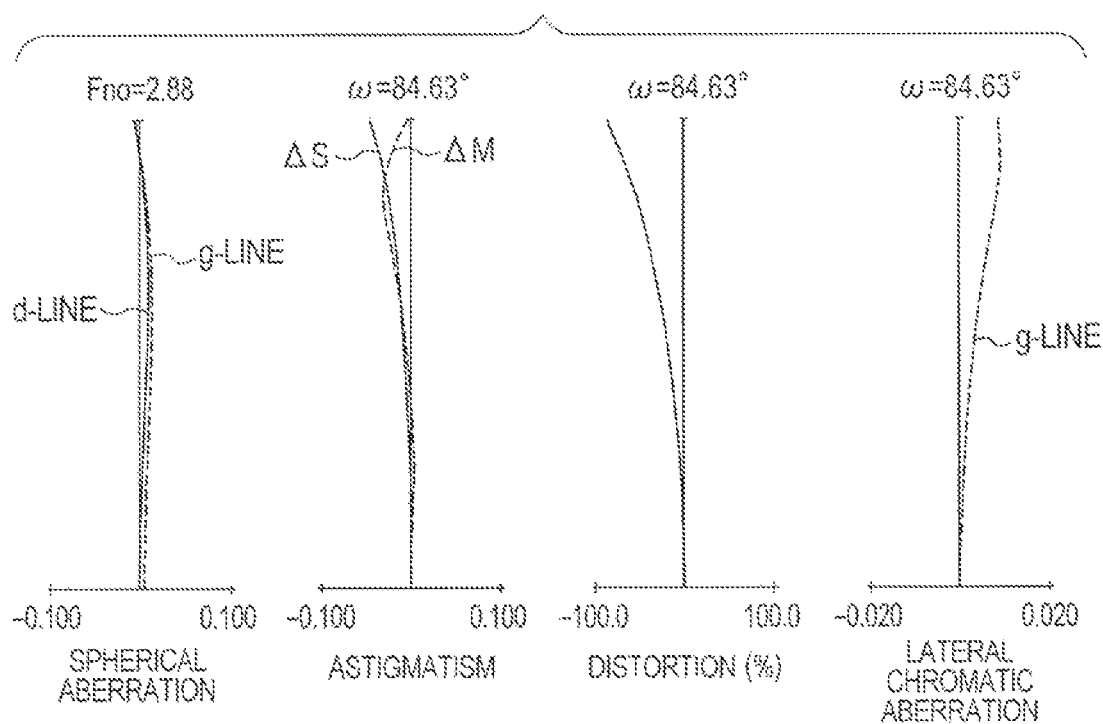
FIG. 2 is an aberration diagram of the image pickup lens in Embodiment 1.

FIG. 2 illustrates spherical aberration for g-line (dotted line) and d-line (solid line), astigmatism in a meridional image plane (ΔM: dotted line) and a sagittal image plane (ΔS: solid line), distortion, and lateral chromatic aberration for g-line, in the image pickup lens in this embodiment. In the aberration diagram, d and g respectively denote d-line and g-line, and ΔM and ΔS respectively denote a meridional image plane and a sagittal image plane. F denotes an f-number, and ω denotes a half angle of field. By aspherically shaping both surfaces of the positive rear first lens G21, spherical aberration and coma are successfully corrected. By setting a large Abbe constant difference in the cemented lens (made up of the rear second lens G22 on the object side and the rear third lens G23 on the image side) and also shaping its cemented surface as a convex surface facing the image side, chromatic aberration is successfully corrected.

Table 1 shows corresponding values in Embodiment 1 for the conditional expressions (1) to (5). In Numerical Embodiment 1, all conditional expressions are satisfied, and an image pickup lens that has a wide angle of field (half angle of field of 84.63°), is compact, and successfully corrects various aberrations is realized.

Embodiment 2

FIG. 3 is a sectional diagram of an image pickup lens in Embodiment 2 (Numerical Embodiment 2) of the present invention. Its lens structure is roughly the same as that of the image pickup lens in Embodiment 1, and so the description of the same structure is omitted.

FIG. 4 illustrates spherical aberration for g-line (dotted line) and d-line (solid line), astigmatism in a meridional image plane (ΔM: dotted line) and a sagittal image plane (ΔS: solid line), distortion, and lateral chromatic aberration for g-line, in the image pickup lens in this embodiment. In the aberration diagram, d and g respectively denote d-line and g-line, and ΔM and ΔS respectively denote a meridional image plane and a sagittal image plane. F denotes an f-member, and ω denotes a half angle of field. By aspherically shaping both surfaces of the positive rear first lens G21, spherical aberration and coma are successfully corrected. By setting a large Abbe constant difference in the cemented lens (the rear second lens G22 and the rear third lens G23; and also shaping its cemented surface as a convex surface facing the image side, chromatic aberration is successfully corrected.

Table 1 shows corresponding values in Embodiment 2 for the conditional expressions (1) to (5). In Numerical Embodiment 2, all conditional expressions are satisfied, and an image pickup lens that has a wide angle of field (half angle of field of 84.95°), is compact, and successfully corrects various aberrations is realized.

Embodiment 3

Figure 5:
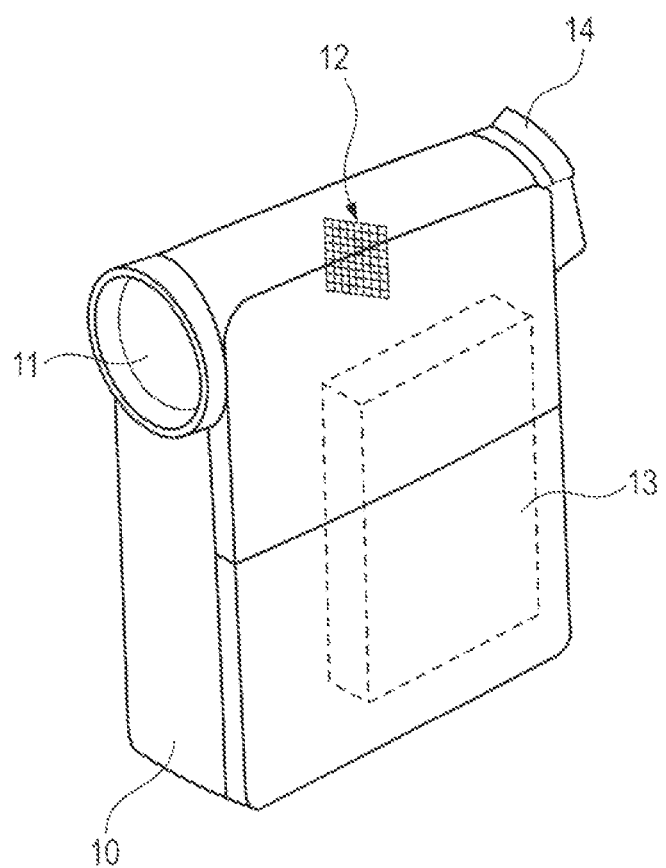
FIG. 5 is a schematic diagram of an optical apparatus (video camera) including an image pickup lens according to the present invention.

The following describes an embodiment of an optical apparatus (video camera) that uses the image pickup lens according to the present invention, with reference to FIG. 5.

FIG. 5 is a schematic diagram of a main part of an image pickup apparatus 10. The image pickup apparatus 10 includes: an image pickup lens 11 having the structure in Embodiment 1 or 2; a solid-state image pickup element 12 such as a CCD sensor or a CMOS sensor for receiving subject light from the image pickup lens 11 (for picking up a subject image formed by the image pickup lens 11); a memory 13 for recording information corresponding to the subject image photoelectrically transduced by the solid-state image pickup element 12; and an electronic viewfinder 14 for observing the subject image.

By using the image pickup lens according to the present invention in an image pickup camera or the like in this way, an image pickup apparatus that has a wide image pickup angle of field of 160° or more, is compact, and has high optical performance can be realised.

The following shows Numerical Embodiments 1 and 2 corresponding to Embodiments 1 and 2.

In each numerical embodiment, surface numbers are in order from the object side to the image side, r denotes a surface curvature radius, d denotes a surface interval, and nd and vd respectively denote a refractive index and an Abbe constant with respect to d-line. In each numerical embodiment, two surfaces nearest the image side are each a plane corresponding to the optical block GB. Moreover, k denotes a conic constant, and A4 to A10 each denote an aspherical coefficient.

Regarding an aspherical surface, let x be a displacement in the direction of the optical axis at a height h from the optical axis with respect to a surface vertex. Then, x is given by the following expression.

$$x = (h^2/R)/[1+\{1-(1+k)(h/R)^2\}^{1/2}] + A4h^4 + A5h^5 + A6h^6 + A7h^7 + A8h^8 + A9h^9 + A10h^{10}$$

here, R is a paraxial curvature radius. For example, "e-Z" denotes "$\times 10^{-z}$". Each aspherical surface is marked with * on the right side of its surface number in each table.

Numerical Embodiment 1

Unit mm

Surface data

| Surface number | r | d | nd | vd |
|---|---|---|---|---|
| 1 | 18.739 | 0.80 | 1.60311 | 60.6 |
| 2 | 4.728 | 1.86 | | |
| 3 | 13.942 | 0.70 | 1.77250 | 49.6 |
| 4 | 3.124 | 2.76 | | |
| 5 | -98.764 | 1.20 | 1.83481 | 42.7 |
| 6 | -9.580 | 1.10 | | |
| 7 (stop) | ∞ | 1.61 | | |
| 8* | 16.812 | 3.50 | 1.55332 | 71.7 |
| 9* | -4.775 | 0.15 | | |
| 10 | 6.702 | 4.50 | 1.48749 | 70.2 |
| 11 | -3.925 | 1.75 | 1.95906 | 17.5 |
| 12 | -18.324 | 0.96 | | |
| 13 | ∞ | 1.30 | 1.51633 | 64.1 |
| 14 | ∞ | | | |

Aspherical surface data

8th surface

K = 1.71328e+000 A4 = -1.26407e-003 A6 = 1.23226e-004
A8 = -3.95832e-005 A10 = -2.55499e-007

9th surface

K = 1.14870e+000 A4 = 1.84035e-003 A6 = 1.00735e-004
A8 = -8.49931e-006 A10 = 2.47077e-006 A12 = -9.08194e-008

| Focal length | 2.76 |
|---|---|
| F-number | 2.88 |
| Half angle of field | 84.63 |
| BF | 2.84 |

Numerical Embodiment 2

Unit mm

Surface data

| Surface number | r | d | nd | vd |
|---|---|---|---|---|
| 1 | 19.846 | 0.60 | 1.69680 | 55.5 |
| 2 | 4.609 | 1.91 | | |
| 3 | 16.690 | 0.50 | 1.72000 | 50.2 |
| 4 | 3.743 | 3.24 | | |
| 5 | 34.095 | 1.00 | 1.80400 | 46.6 |
| 6 | -11.487 | 1.10 | | |
| 7 (stop) | ∞ | 2.33 | | |
| 8* | 40.117 | 2.83 | 1.55332 | 71.7 |
| 9* | -4.300 | 0.40 | | |
| 10 | 9.893 | 4.34 | 1.59522 | 67.7 |
| 11 | -4.280 | 1.64 | 1.92286 | 18.9 |
| 12 | -84.663 | 0.97 | | |
| 13 | ∞ | 1.30 | 1.51633 | 64.1 |
| 14 | ∞ | | | |

Aspherical surface data

8th surface

K = 0.00000e+000 A4 = -3.20074e-003 A6 = -1.51450e-005
A8 = -4.26332e-005 A10 = -1.10920e-006

9th surface

K = 1.75006e-001 A4 = 2.74220e-004 A6 = -8.78096e-005
A8 = 8.80016e-006 A10 = -1.50273e-006

| Focal length | 2.75 |
|---|---|
| F-number | 2.88 |
| Half angle of field | 84.95 |
| BF | 2.86 |

TABLE 1

Numerical values corresponding to conditional expressions in each embodiment

| | | Embodiment 1 | Embodiment 2 |
|---|---|---|---|
| Conditional expression (1) | vp/vn | 2.446 | 2.466 |
| Conditional expression (2) | f1/f2 | -1.296 | -2.010 |
| Conditional expression (3) | vcp/vcn | 4.011 | 3.582 |
| Conditional expression (4) | v1n/v1p | 1.162 | 1.077 |
| Conditional expression (5) | f1/f | -2.628 | -4.360 |

Though the image pickup lens of the structure that does not include a movable lens is illustrated in the embodiments described above, the present invention is not limited to this structure, and the system of the image pickup lens may be partly or wholly movable in the direction perpendicular to the optical axis during image pickup, to provide a function of correcting blurring of a picked up image, namely, an image stabilization function.

Though the image pickup lens according to the present invention has high optical performance by appropriately correcting various aberrations by the structure in each embodiment, distortion, chromatic aberration, and the like may be corrected by performing an electrical correction process on an image signal that is obtained by the image pickup element receiving subject light from the image pickup lens according to the present invention.

Though the exemplary embodiments of the present invention have been described above, the present invention is not limited to these exemplary embodiments and optical specifications (angle of field, f-number), and various modifications are possible on the lens shape, the number of lenses, and the like within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-072747, filed Mar. 29, 2013, which is hereby incorporated by reference herein in its entirety.

What is claimed is:

1. An image pickup lens comprising, in order from an object ride so an image side:
   a front lens unit having negative refractive power;
   a stop; and
   a rear lens unit having positive refractive power,
   wherein the front lens unit includes a front first lens having negative refractive power, a front second lens having negative refractive power, and a front third lens having positive refractive power, in order from the object side to the image side,
   wherein the rear lens unit includes a rear first lens having at least one aspherical surface and having positive refractive power and a cemented lens that is made up of a rear second lens having a positive refractive power and a rear third lens having a negative refractive power, in order from the object side to the image side, and
   wherein the following are satisfied $2.3 < vp/vn < 4.0$ $-3.0 < f1/f2 < -1.0$ where $vp$ is an Abbe constant of a positive lens disposed on a most object side in the image pickup lens, $vn$ is an Abbe constant of a negative lens disposed on a most image side in the image pickup lens, f1 is a focal length of the front lens unit, and f2 is a focal length of the rear lens unit.

2. The image pickup lens according to claim 1, wherein the following conditional expression is satisfied $3.0 < vcp/vcn < 5.0$ where $vcp$ is an Abbe constant of the rear second lens, and $vcn$ is an Abbe constant of the rear third lens.

3. The image pickup lens according to claim 1, wherein the following conditional expression is satisfied $0.8 < vln/vlp < 1.5$ where $vln$ is an Abbe constant of the front second lens, and $vlp$ is an Abbe constant of the front third lens.

4. The image pickup lens according to claim 1, wherein the following conditional expression is satisfied $-6.0 < f1/f < -2.0$ where f is a focal length of the image pickup lens.

5. The image pickup lens according to claim 1, wherein the front first lens is a meniscus lens having a concave surface facing the image side,
   wherein the front second lens is a meniscus lens having a concave surface facing the image side, and
   wherein the front third lens has a convex surface facing the image side.

6. The image pickup lens according to claim 1, wherein the rear first lens has both surfaces as convex aspherical surfaces,
   wherein the rear second lens has both surfaces as convex surfaces and has positive refractive power, and
   wherein the rear third lens has a concave surface facing the object side and has negative refractive power.

7. An image pickup apparatus comprising:
   an image pickup lens comprising, in order from an object side to an image side:
   a front lens unit having negative refractive power;
   a stop; and
   a rear lens unit having positive refractive power,
   wherein the front lens unit includes a front first lens having negative refractive power, a front second lens having negative refractive power, and a front third lens having positive refractive power, in order from the object side to the image side,
   wherein the rear lens unit includes a rear first lens having at least one a spherical surface and having positive refractive power and a cemented lens that is made up of a rear second lens having a positive refractive index and a rear third, lens having a negative refractive index, in order from the object side to she image side, and
   wherein the following are satisfied $2.3 < vp/vn < 4.0$ $-3.0 < f1/f2 < -1.0$ where $vp$ is an Abbe constant of a positive lens disposed on a most object side in the image pickup lens, $vn$ is an Abbe constant of a negative lens disposed on a most image side in the image pickup lens, f1 is a focal length of the front lens unit, and f2 is a focal length of the rear lens unit; and
   an image pickup element for receiving an image formed by the image pickup lens.

* * * * *